(12) United States Patent
Iba et al.

(10) Patent No.: US 10,088,684 B2
(45) Date of Patent: Oct. 2, 2018

(54) HEAD-MOUNTED DISPLAY DEVICE AND LIGHT GUIDE PRISM

(71) Applicant: OLYMPUS CORPORATION, Tokyo (JP)

(72) Inventors: Yoichi Iba, Tokyo (JP); Ryohei Sugihara, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 192 days.

(21) Appl. No.: 15/219,757

(22) Filed: Jul. 26, 2016

(65) Prior Publication Data

US 2016/0334625 A1    Nov. 17, 2016

Related U.S. Application Data

(63) Continuation of application No. PCT/JP2014/003427, filed on Jun. 26, 2014.

(51) Int. Cl.
*G02B 27/14* (2006.01)
*G02B 27/01* (2006.01)
*G02B 27/00* (2006.01)

(52) U.S. Cl.
CPC ..... *G02B 27/0172* (2013.01); *G02B 27/0018* (2013.01); *G02B 2027/0178* (2013.01)

(58) Field of Classification Search
CPC ............ G02B 27/0172; G02B 27/0018; G02B 2027/0178
See application file for complete search history.

(56) References Cited

U.S. PATENT DOCUMENTS

2005/0078388 A1    4/2005  Amitai

FOREIGN PATENT DOCUMENTS

| JP | 2002-214603 A | 7/2002 |
| JP | 2002-228970 A | 8/2002 |
| JP | 2004-021002 A | 1/2004 |
| JP | 2005-514652 A | 5/2005 |
| JP | 2006-301180 A | 11/2006 |

(Continued)

OTHER PUBLICATIONS

Chinese Office Action dated Jan. 17, 2018 in Chinese Patent Application No. 201480074356.8.

(Continued)

*Primary Examiner* — Joseph P Martinez
(74) *Attorney, Agent, or Firm* — Scully, Scott, Murphy & Presser, P.C.

(57) ABSTRACT

The head-mounted display device includes a display element, a light guide prism that, in a state of use, guides a regular image light beam from the display element to an exit surface in front of the user's eye, and a support that secures the display element and the light guide prism with respect to the user's head. On at least one side along the optical axis of the regular image light beam, the light guide prism includes at least one first-type inclined surface at a position outside of the region through which the regular image light beam from the display element passes, and the first-type inclined surface is formed to be inclined so as to cause light incident on the first-type inclined surface from a direction along the optical axis of the regular image light beam to be reflected and emitted to the outside of the user's eyeball.

21 Claims, 17 Drawing Sheets

(56) References Cited

FOREIGN PATENT DOCUMENTS

| | | | | |
|---|---|---|---|---|
| JP | 2007-018344 A | 1/2007 | | |
| JP | 2007-286317 | * 11/2007 | ............ | G02B 27/02 |
| JP | 2007-286317 A | 11/2007 | | |
| JP | 5539603 B1 | 7/2014 | | |

OTHER PUBLICATIONS

International Search Report dated Oct. 14, 2014 issued in PCT/JP2014/003427.
Japanese Office Action dated Jan. 9, 2018 in Japanese Patent Application No. 2015-559617.

* cited by examiner

Inclination $(|\xi|) = \left|\tan^{-1}\left(\frac{a+b}{L}\right)\right|$

Inclination $(|\xi'|) = \tan^{-1}\left(\frac{1}{n}\sin|\xi|\right)$

Inclination $(|\eta|) = \left|\sin^{-1}\left(\frac{1}{n}\sin|\xi|\right) - \sin^{-1}\left(\frac{1}{n}N\right)\right|$

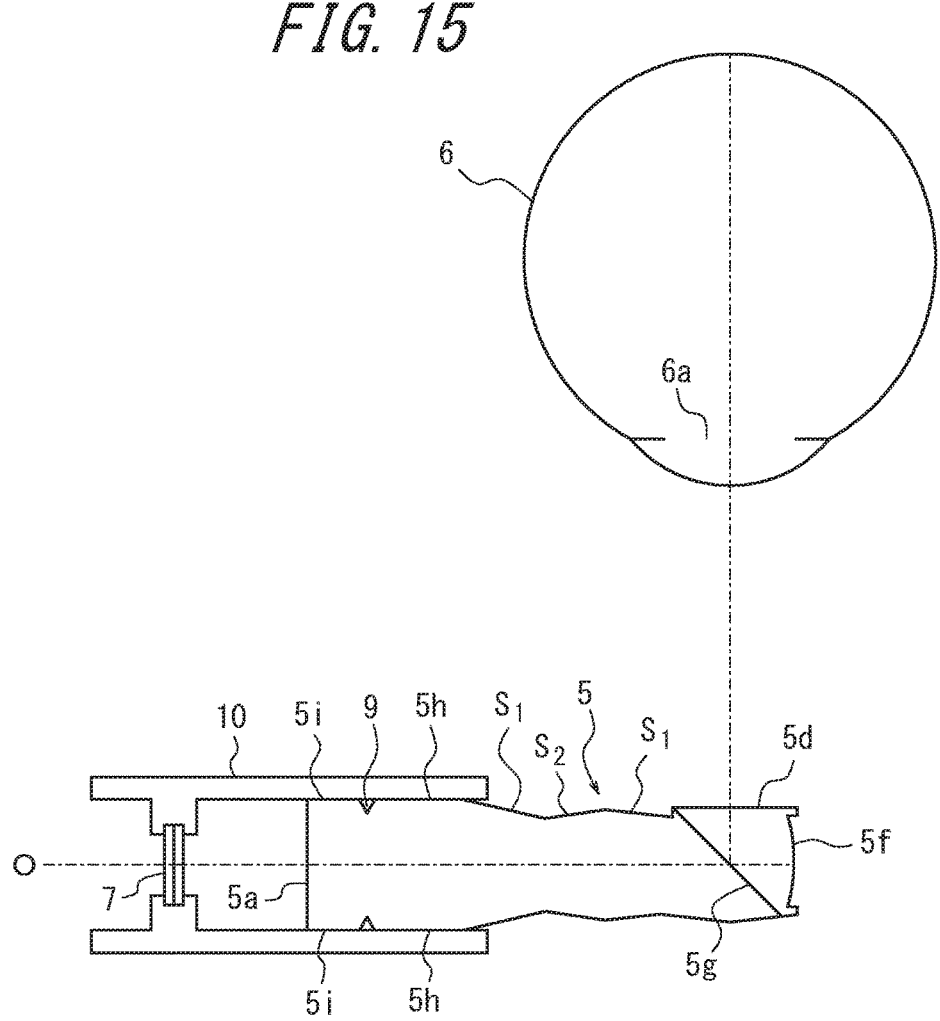

HEAD-MOUNTED DISPLAY DEVICE AND LIGHT GUIDE PRISM

CROSS-REFERENCE TO RELATED APPLICATION

The present application is a Continuing Application based on International Application PCT/JP2014/003427 filed on Jun. 26, 2014, which in turn claims priority to International Application PCT/JP2014/000423 filed on Jan. 28, 2014, the entire disclosure of these earlier applications being incorporated herein by reference.

TECHNICAL FIELD

This disclosure relates to a head-mounted display device and to a light guide prism used therein.

BACKGROUND

In recent years, compact, wearable head-mounted display devices that can be worn on the head or on eyeglasses have been proposed. For example, in one such known head-mounted display device, image light of an image displayed on a small image display element secured to the temporal region is guided by a transparent light-guiding member to a position in front of the eye to display the image as a magnified virtual image in an observer's field of view. By using the small, lightweight light-guiding member, the field of view is not greatly blocked, and the entire head-mounted display device can be made small and lightweight, allowing use as a wearable device that can continually be worn on the body and used.

By reducing the light-guiding member in size, however, light that strays from the optical path of a regular image light beam and is reflected at the inner sides of the light-guiding member (hereinafter referred to as side reflected irregular light) tends to occur. Upon entering the eye, this light causes a ghost to form (and is hereinafter referred to as ghost light). In particular, as the cross-sectional size of the light-guiding member is smaller, ghost light reflected at the sides of the light-guiding member produces ghosts that can be seen near the display image in the field of view. To address this problem, one known technique for removing ghost light that is reflected at the prism sides is to form the prism side so that a cross-section thereof has a V-shaped groove (V-groove) near the position where unnecessary reflection occurs and to further provide a light-blocking member in the V-groove or to treat the V-groove with light-blocking paint, thereby causing the V-groove to function as a flare stop and block unnecessarily reflected light beams (unnecessary light) (for example, see JP 2007-18344 A (PTL 1)).

CITATION LIST

Patent Literature

PTL 1: JP 2007-18344 A

SUMMARY

A head-mounted display device according to this disclosure includes:
a display element;
a light guide prism configured, in a state of use, to guide a regular image light beam from the display element to a position in front of an eye of a user; and
a support configured to secure the display element and the light guide prism with respect to a head of the user;
wherein on at least one side along an optical axis of the regular image light beam, the light guide prism includes at least one first-type inclined surface, and the first-type inclined surface is formed to be inclined at an inclination angle that causes light emitted from the display element and incident on the first-type inclined surface from a direction along the optical axis of the regular image light beam to be reflected and emitted to outside of a pupil of the user.

The first-type inclined surface may be formed as a polished surface and totally reflect the light incident from the direction along the optical axis of the regular image light beam.

The first-type inclined surface may be formed to be inclined at an angle that causes a regular reflection component of the light incident from the direction along the optical axis of the regular image light beam to be emitted to outside of an eyeball of the user.

The first-type inclined surface may be formed so that $|\theta|<\arcsin(1/n)$, where n is a refractive index of the light guide prism, and $\theta$ is the inclination angle of the first-type inclined surface relative to the optical axis of the regular image light beam adjacent to the first-type inclined surface.

The first-type inclined surface may be formed so that following formulas (1) and (2) are satisfied;

$$|\xi| = \tan^{-1}\left(\frac{a+b}{L}\right) \quad (1)$$

and $$\frac{1}{2}\left|\sin^{-1}\left(\frac{1}{n}\sin|\xi|\right) - \sin^{-1}\left(\frac{1}{n}N\right)\right| < n|\theta| \quad (2)$$

where n is a refractive index of the light guide prism, N is a numerical aperture of the regular image light beam that enters the light guide prism, a is a radius of the regular image light beam at an exit surface of the light guide prism, b is a maximum radius of the pupil of the user in terms of design, L is a distance from the exit surface to the pupil of the user in terms of design, and $\theta$ is the inclination angle of the first-type inclined surface relative to the optical axis of the regular image light beam adjacent to the first-type inclined surface.

The maximum radius b of the pupil of the user in terms of design may be 3.5 mm to 4.5 mm, and the distance L from the exit surface to the pupil of the user in terms of design may be 10 mm to 20 mm.

The light guide prism may include a second-type inclined surface, adjacent to the display element side of the first-type inclined surface, and the second-type inclined surface may be formed to be inclined at an inclination angle that causes light, from the display element, inclined at a largest inclination angle relative to the optical axis of the regular image light beam and incident on the second-type inclined surface to be reflected by the second-type inclined surface and then reflected by the first-type inclined surface and emitted to the outside of the pupil of the user.

The second-type inclined surface may be formed as a polished surface.

The second-type inclined surface may be formed so that a relationship $|\gamma|<60°-|\theta|$ is satisfied, where $\theta$ is the inclination angle of the first-type inclined surface relative to the optical axis of the regular image light beam adjacent to the first-type inclined surface, and $\gamma$ is the inclination angle of the second-type inclined surface relative to the optical axis of the regular image light beam adjacent to the second-type inclined surface.

The first-type inclined surface may be positioned by the second-type inclined surface in a direction of travel of the regular image light beam, and the second-type inclined surface may be formed so that following formulas (3) and (4) are satisfied;

$$|\gamma| > \frac{1}{2}|\varepsilon| - |\theta| + \alpha \quad (3)$$

and $$\alpha = \frac{1}{2}\left|\sin^{-1}\left(\frac{1}{n}\sin|\xi|\right) - \sin^{-1}\left(\frac{1}{n}N\right)\right| \quad (4)$$

where $\theta$ is the inclination angle of the first-type inclined surface relative to the optical axis of the regular image light beam adjacent to the first-type inclined surface, $\varepsilon$ is a maximum inclination angle of a light ray incident on the second-type inclined surface at a specific point, and $\gamma$ is the inclination angle of the second-type inclined surface relative to the optical axis of the regular image light beam adjacent to the second-type inclined surface.

The following formula (5) may be satisfied:

$$\varepsilon = \tan^{-1}\left(\frac{p+h}{W}\right) \quad (5)$$

where p is a length from a center to a periphery of an image of the display element formed by an optical system between a position of the specific point on the second-type inclined surface and the display element (the actual display element), h is a length of a perpendicular to the optical axis from the specific point on the second-type inclined surface, and W is a distance from an intersection between the perpendicular and the optical axis to the image of the display element.

The first-type inclined surface may approach the optical axis of the regular image light beam in a direction of travel of the regular image light beam, and the second-type inclined surface may recede from the optical axis of the regular image light beam in the direction of travel of the regular image light beam.

The light guide prism may have at least two continuous depressions by the first-type inclined surface and the second-type inclined surface being formed alternately.

Furthermore, surface roughening treatment may be applied near a ridge of the depressions formed by the first-type inclined surface and the second-type inclined surface.

A light guide prism according to this disclosure includes:
an entrance surface through which light enters;
an exit surface configured to emit light entering from the entrance surface; and
a plurality of sides surrounding an optical path of the light;
wherein on at least a portion of the sides, a plurality of inclined surfaces formed by a first-type inclined surface and a second-type inclined surface with different inclination directions are disposed to form two or more continuous depressions, the first-type inclined surface is inclined, relative to an optical axis of light entering from the entrance surface and emitted from the exit surface, at an inclination angle $\theta$ so as to approach the optical axis in a direction of travel of the light, the second-type inclined surface is inclined, relative to the optical axis, at an inclination angle $\gamma$ so as to recede from the optical axis in the direction of travel of the light, and the first-type inclined surface and the second-type inclined surface that are adjacent to form the depressions satisfy $|\gamma|<60°-|\theta|$.

The first-type inclined surface and the second-type inclined surface may be formed as polished surfaces. Alternatively, surface roughening treatment may be applied to at least a portion of the first-type inclined surface and the second-type inclined surface.

The light guide prism may further include a reflecting surface configured to reflect the light incident from the entrance surface towards the exit surface.

The first-type inclined surface may be formed so that a relationship $|\theta|<\arcsin(1/n)$ is satisfied, where n is a refractive index of the light guide prism, and $\theta$ is the inclination angle of the first-type inclined surface relative to the optical axis.

The entrance surface may be positioned so that a regular image light beam from a display element enters through the entrance surface, and the exit surface may emit the regular image light beam towards an eyeball; and the first-type inclined surface may be formed so that following formulas (6) and (7) are satisfied;

$$|\xi| = \tan^{-1}\left(\frac{a+b}{L}\right) \quad (6)$$

and $$\frac{1}{2}\left|\sin^{-1}\left(\frac{1}{n}\sin|\xi|\right) - \sin^{-1}\left(\frac{1}{n}N\right)\right| < |\theta| \quad (7)$$

where n is a refractive index of the light guide prism, N is a numerical aperture of the regular image light beam that enters the light guide prism, a is a radius of the regular image light beam at an exit surface of the light guide prism, b is a maximum radius of the pupil of the user in terms of design, L is a distance from the exit surface to the pupil of the user in terms of design, and $\theta$ is the inclination angle of the first-type inclined surface relative to the optical axis of the regular image light beam adjacent to the first-type inclined surface.

The first-type inclined surface may be positioned by the second-type inclined surface in the direction of travel of the regular image light beam, and the second-type inclined surface may be formed so that following formulas (8) and (9) are satisfied;

$$|\gamma| > \frac{1}{2}|\varepsilon| - |\theta| + \alpha \quad (8)$$

and $$\alpha = \frac{1}{2}\left|\sin^{-1}\left(\frac{1}{n}\sin|\xi|\right) - \sin^{-1}\left(\frac{1}{n}N\right)\right| \quad (9)$$

where $\varepsilon$ is a maximum inclination angle of a light ray incident on the second-type inclined surface at a specific point, and $\gamma$ is the inclination angle of the second-type inclined surface relative to the optical axis of the regular image light beam adjacent to the second-type inclined surface.

BRIEF DESCRIPTION OF THE DRAWINGS

In the accompanying drawings.

FIG. 15 illustrates the structure of the optical system of a head-mounted display device according to Embodiment 4;

DETAILED DESCRIPTION

The following describes embodiments with reference to the drawings.

Embodiment 1

Figure 1:
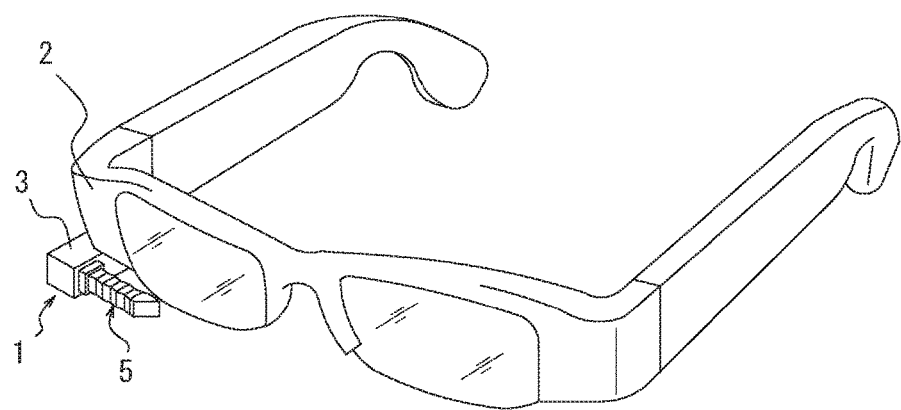
FIG. 1 illustrates the appearance of a head-mounted display device according to Embodiment 1.

FIG. 1 is a perspective view illustrating the appearance of a head-mounted display device 1 according to Embodiment 1. Overall, the head-mounted display device 1 includes a body 3 fixed to the temple (frame by the temporal region) of eyeglasses 2 and a light guide prism 5, one end of which is supported by the body 3, and the other end of which extends before the observer's eye when the head-mounted display device 1 is worn. Accordingly, when the head-mounted display device 1 is worn on the head, the eyeglasses 2 function as a support. The body 3 also contains a display element 7, such as an LCD or an organic EL (see FIGS. 3, 4A, and 4B), an electrical circuit for displaying an image in the display element 7, a communication function for receiving video data from outside the body 3 by a wired or wireless connection, and the like.

Figure 2:
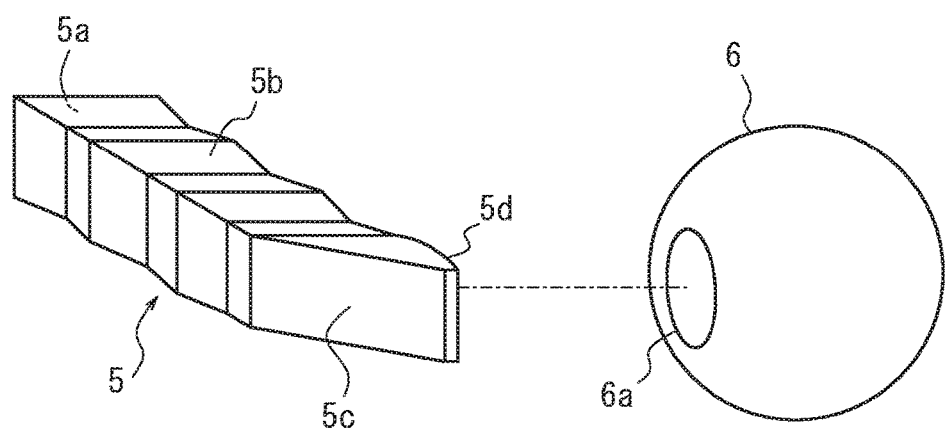
FIG. 2 is an expanded view of the light guide prism in FIG. 1 and of the position of the user's eyeball when using the light guide prism.

FIG. 2 is an expanded view of the light guide prism 5 in FIG. 1 and of the position of the user's eyeball when using the light guide prism 5. The light guide prism 5 is an optical element formed by transparent plastic or glass material and includes an entrance surface 5a positioned in the body 3, four sides extending in the longitudinal direction of the light guide prism 5 (hereinafter referred to collectively as sides 5b), a reflecting surface 5c formed as a total reflection surface, and an exit surface 5d positioned at the eyeball 6 side. The regular image light beam emitted from the display element 7 of the body 3 enters from the entrance surface 5a, is reflected at the reflecting surface 5c, and is emitted from the exit surface 5d towards the pupil 6a of the user's eyeball 6. The exit surface 5d is configured as a surface that prescribes an optical axis (illustrated by the dot-dash line in FIG. 2) with a positive refractive power and functions as an eyepiece. The exit surface 5d may be configured by connecting an eyepiece to the surface of the light guide prism 5 at the eyeball 6 side. Hereinafter, when the head-mounted display device 1 is being used, the forward-facing direction of the line of sight of the eyeball 6 is considered the front, and the direction facing the eyeball 6 is considered the back. The upward and downward directions during use are simply referred to as above and below.

On each of the four sides 5b of the light guide prism 5, a plurality of inclined surfaces having a small inclination angle relative to the optical axis are formed continuously in the optical axis direction. These inclined surfaces are formed as polished surfaces and have high reflectance. The inclined surfaces are disposed along the four sides 5b so as to surround the optical axis. Furthermore, the inclined surfaces are disposed on the sides 5b so that a forward-facing inclined surface and a backward-facing inclined surface are disposed alternately. A normal to the forward-facing inclined surface includes a component in the direction of travel of the regular image light beam, whereas a normal to the backward-facing inclined surface includes a component in the opposite direction from the direction of travel of the regular image light beam. Therefore, between the inclined surfaces, a ridge that forms a peak (convex ridge) and a ridge that forms a valley (concave ridge) are alternately formed. As a result, at least two depressions are formed continuously on the sides 5b. Furthermore, the inclined surfaces on the sides 5b are formed as polished surfaces. The inclined surfaces on the sides 5b reflect side reflected irregular light that strays from the optical path of the regular image light beam, deflecting the side reflected irregular light to the outside of the pupil 6a of the user's eyeball 6. Light that does not enter the pupil 6a is not visible to the user and therefore does not become ghost light.

Figure 3:
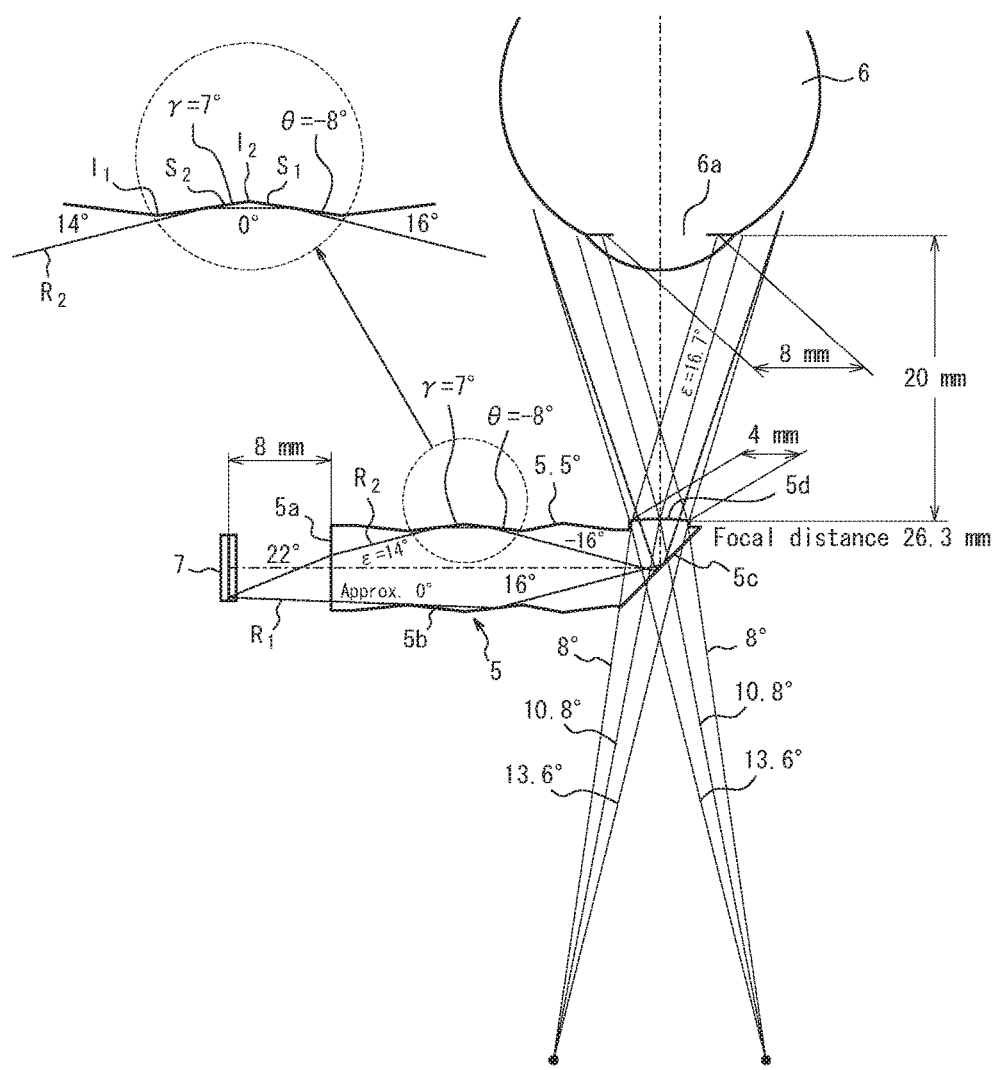
FIG. 3 illustrates the optical path of side reflected irregular light emitted from the display element.

FIG. 3 illustrates the optical path of side reflected irregular light emitted from the display element 7. The display element 7 is rectangular. The light guide prism 5 corresponds to the four sides of the rectangular display element 7 and has four sides 5b extending in the optical axis direction of the regular image light beam. As representative optical paths of the side reflected irregular light that passes through the light guide prism 5, FIG. 3 shows two examples of side reflected irregular light $R_1$ and $R_2$. The side reflected irregular light $R_1$ is light that is emitted from an edge at the front of the image display region of the display element 7 in a direction nearly along the optical axis of the regular image light beam and hits the side 5b in front at a small angle. The side reflected irregular light $R_2$ is light that is emitted from an edge at the front of the image display region of the display element 7 in a direction that intersects the optical axis of the regular image light beam and strikes a specific point on a side at the back, on the opposite side of the optical axis, at a certain angle.

The light guide prism 5 reflects the side reflected irregular light $R_1$ once at an inclined surface (first-type inclined surface) $S_1$, on the side 5b at the front, that approaches the optical axis of the regular image light beam in the direction of travel of the regular image light beam. The light guide prism 5 then reflects the side reflected irregular light $R_1$ at the reflecting surface 5c to direct the side reflected irregular light $R_1$ to the outside of the pupil 6a of the eyeball 6. Furthermore, the light guide prism 5 consecutively reflects the side reflected irregular light $R_2$ at an inclined surface (second-type inclined surface) $S_2$, on the side 5b at the back, that recedes from the optical axis in the direction of travel of the regular image light beam and at an inclined surface (first-type inclined surface) $S_1$ that approaches the optical axis. The light guide prism 5 then reflects the side reflected irregular light $R_2$ at the reflecting surface 5c to direct the side reflected irregular light $R_2$ to the outside of the pupil 6a of the eyeball 6. The upper-left portion of FIG. 3 is an expanded view of the side reflected irregular light $R_2$ that is consecutively reflected by the second-type inclined surface $S_2$ and the first-type inclined surface $S_1$. Here, $l_1$ and $l_2$ are respectively a concave ridge and a convex ridge. Furthermore, in FIG. 3, to facilitate the following explanation, the optical path of side reflected irregular light that is reflected at the side 5b and does not enter the pupil 6a of the eyeball 6 is illustrated as linear optical paths in the medium of the light guide prism 5 (the paths of light rays emitted from the points at the bottom of FIG. 3), without taking into consideration reflection by the side 5b and the reflecting surface 5c.

Next, the following describes how with regard to the side reflected irregular light $R_1$, when $$\alpha = \frac{1}{2}\left|\sin^{-1}\left(\frac{1}{n}\sin|\xi|\right) - \sin^{-1}\left(\frac{1}{n}N\right)\right| \quad (10)$$

$$|\xi| = \tan^{-1}\left(\frac{a+b}{L}\right) \quad (11)$$

where n is the refractive index of the light guide prism 5, N is the numerical aperture of the regular light beam in the light guide prism, a is the radius of the light beam at the exit surface 5d of the light guide prism 5, b is the maximum radius of the user's pupil 6a, and L is the distance from the exit surface 5d to the user's pupil 6a, then if the inclination angle θ of the first-type inclined surface $S_1$ relative to the optical axis of the adjacent regular image light beam satisfies $$|\theta| > \alpha \quad (12)$$

the side reflected irregular light $R_1$ is deflected from the direction of the pupil 6a of the eyeball 6. Hereinafter, the inclination of the light ray and the inclination of the surface are represented with the counterclockwise direction being positive, unless otherwise indicated. The maximum radius b of the user's pupil 6a is preferably 3.5 mm to 4.5 mm. The reason is that a young person's pupil is known to open to this degree on average. The distance L from the exit surface 5d to the user's pupil 6a is preferably 10 mm to 20 mm in terms of design. The reason is that if the distance L falls below 10 mm, the exit surface of the light guide prism tends to be soiled by droplets of tears that become airborne upon blinking, whereas the distance L exceeding 20 mm destabilizes the head-mounted display device 1 when worn. In general, the distance between the eyepiece and the eye is adjusted to 12 mm.

Figure 4A:
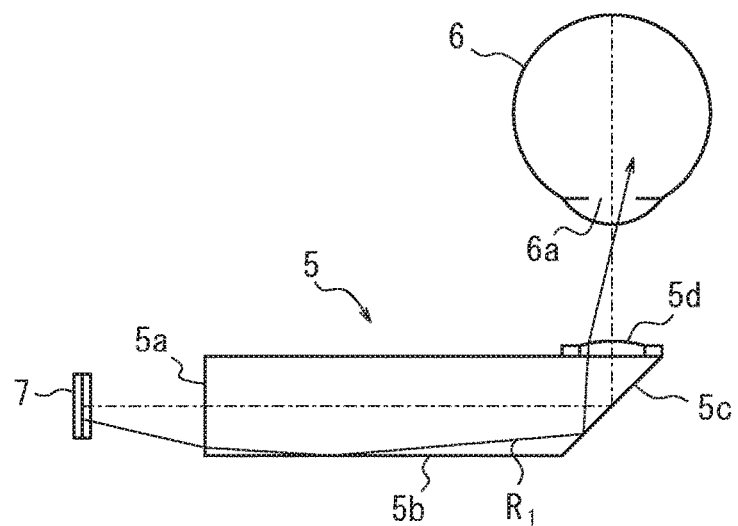
FIGS. 4A and 4B illustrate the path of side reflected irregular light that is incident on the side of the light guide prism in the optical axis direction, with FIG. 4A illustrating the path of side reflected irregular light that is reflected at the reflecting side and enters the pupil, and FIG. 4B illustrating an equivalent optical system to FIG. 4A.
Figure 4B:
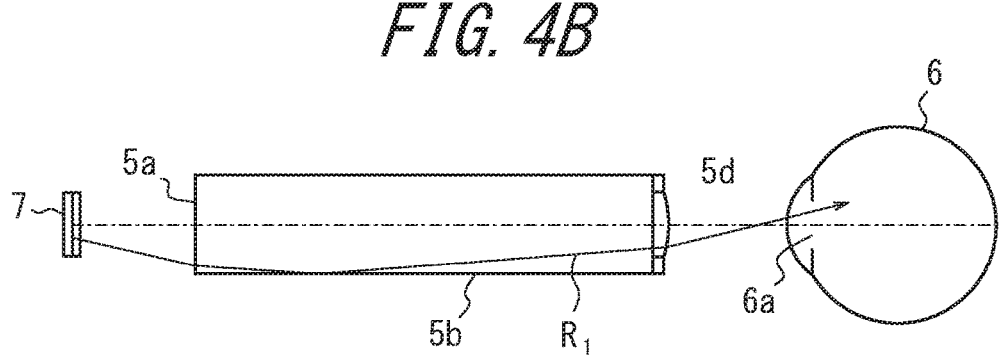

First, with regard to the reflecting surface 5c of the light guide prism 5, the mirror term can be dropped from the calculation formula when calculating the inclination of the light ray and the inclination of the prism with the optical axis as a standard, since a flat reflecting surface does not have a refractive power. FIGS. 4A and 4B illustrate the path of side reflected irregular light that is incident on the side 5b of the light guide prism 5 in the optical axis direction, with FIG. 4A illustrating the path of side reflected irregular light that is reflected at the reflecting side and enters the pupil 6a, and FIG. 4B illustrating an equivalent optical system to FIG. 4A. The following calculations are based on an equivalent optical system that removes the effect of reflection by the reflecting surface 5c of the light guide prism 5, as illustrated in FIG. 4B.

Figure 5:
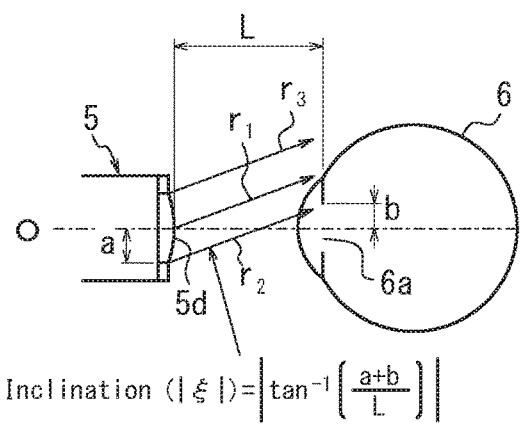
FIG. 5 illustrates a condition so that a light ray emitted from an eyepiece at the exit surface does not enter the pupil.

FIG. 5 illustrates a condition so that a light ray emitted from the eyepiece at the exit surface 5d does not enter the pupil 6a. A light beam emitted from one point of the display element 7 is emitted from the exit surface 5d and then becomes an approximately parallel light beam. The reason is that since a person's eye focuses on an approximately parallel light beam, the light guide prism 5 is designed accordingly. Therefore, the condition for the side reflected irregular light ($r_1$ to $r_3$) directed upwards as in FIG. 5 not to enter the pupil 6a is that the light ray of the side reflected irregular light $r_2$, which exits from the extreme edge of the exit surface 5d and cuts across the optical axis O, does not enter the pupil 6a. Note that $r_1$ is the light ray, among the light beam of the side reflected irregular light, that traverses the center of the exit surface 5d, and $r_3$ is the light beam that is emitted from the opposite edge of the exit surface 5d from the light ray $r_2$ in the light beam of the side reflected irregular light. When a is the radius of the light beam at the exit surface 5d of the light guide prism 5, b is the maximum radius of the user's pupil 6a, and L is the distance from the emission edge of the light beam to the user's pupil 6a, as described above, then the term |ξ| in Expression (11) is the minimum inclination angle of a light ray that exits the eyepiece at the exit surface 5d and escapes the pupil 6a.

Figure 6:
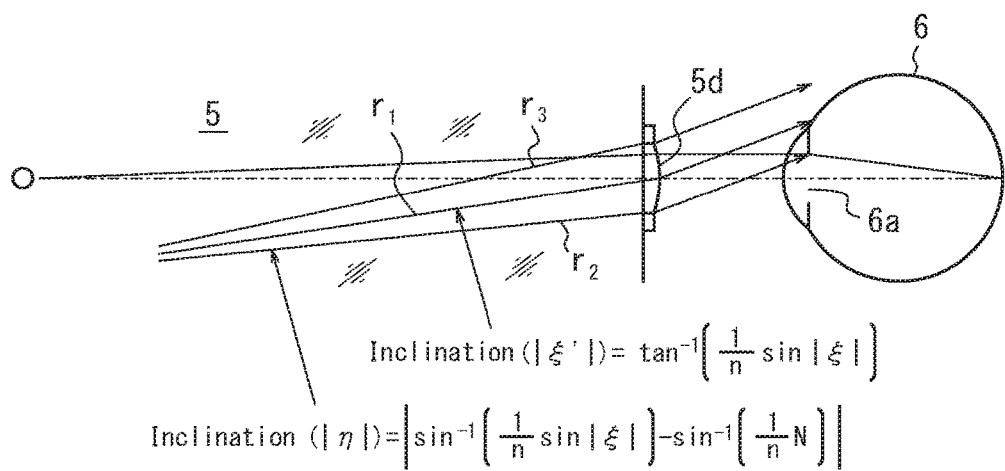
FIG. 6 illustrates a condition on the inclination of a light ray within the prism so that a light ray emitted from the exit surface does not enter the pupil.

Next, FIG. 6 illustrates a condition on the inclination of a light ray within the light guide prism 5 so that a light ray emitted from the exit surface 5d does not enter the pupil 6a. Among the light rays that have an inclination of |ξ| after being emitted from the exit surface 5d, the inclination of the side reflected irregular light $r_1$ within the light guide prism 5 is |ξ'|, and the inclination of the side reflected irregular light $r_2$ within the light guide prism 5 is |η|. The side reflected irregular light $r_1$ passes through the center of the exit surface 5d. At this position, since the exit surface 5d is orthogonal to the optical axis O, the following expression is derived from the law of refraction (Snell's law).

$$|\xi'| = \sin^{-1}\left(\frac{1}{n}\sin|\xi|\right) \tag{13}$$

Figure 7:
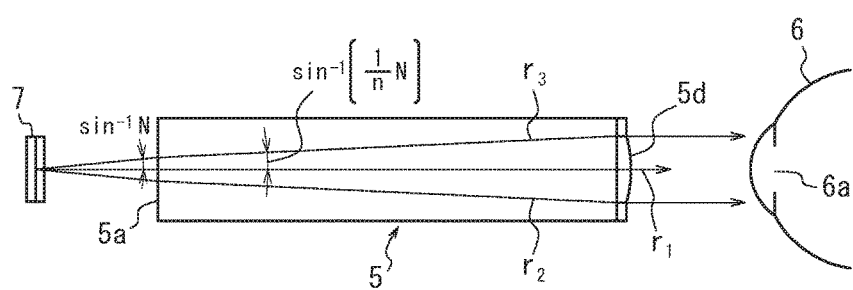
FIG. 7 illustrates the opening angle of a light beam within the light guide prism.

With regard to the side reflected irregular light $r_2$, letting N be the numerical aperture of the regular image light beam in the light guide prism, the following is derived from the law of refraction and the equation for the numerical aperture (NA) in a medium, as illustrated in FIG. 7, which illustrates the opening angle of a light beam within the light guide prism 5.

$$N = n \cdot \sin(\text{opening angle of light beam}/2) \tag{14}$$

Accordingly, the opening angle at one side of the light beam within the light guide prism 5 is as follows.

$$\sin^{-1}\left(\frac{1}{n}N\right)$$

Therefore, the inclination $|\eta|$ of the side reflected irregular light $r_2$ within the light guide prism 5 is obtained by the following expression.

$$|\eta| = \left|\sin^{-1}\left(\frac{1}{n}\sin|\xi|\right) - \sin^{-1}\left(\frac{1}{n}N\right)\right| \tag{15}$$

Figure 8:
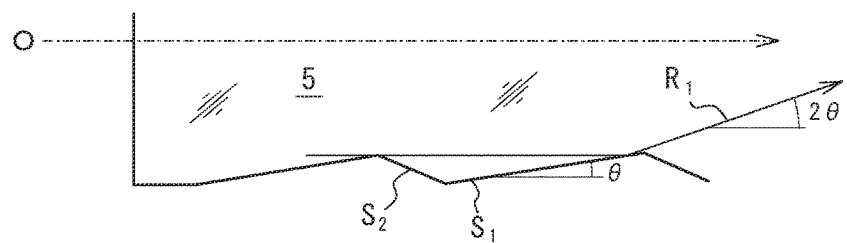
FIG. 8 illustrates the inclination, due to reflection by the first-type inclined surface, of the side reflected irregular light in the optical axis direction.

FIG. 8 illustrates the inclination, due to reflection by the first-type inclined surface $S_1$, of the side reflected irregular light $R_1$ in the optical axis direction. When the side reflected irregular light $R_1$ parallel to the optical axis O is reflected at the first-type inclined surface $S_1$, which is formed on the side 5b of the light guide prism 5 and has an inclination θ, the inclination of the light ray of the reflected side reflected irregular light $R_1$ is 2θ. If |2θ| is greater than |η|, i.e. if |2θ|>|η|, then this light ray does not create a ghost. Accordingly, Expressions (10) to (12) above are obtained in light of Expression (15), and when this condition is satisfied, the side reflected irregular light $R_1$ does not create a ghost.

Figure 9:
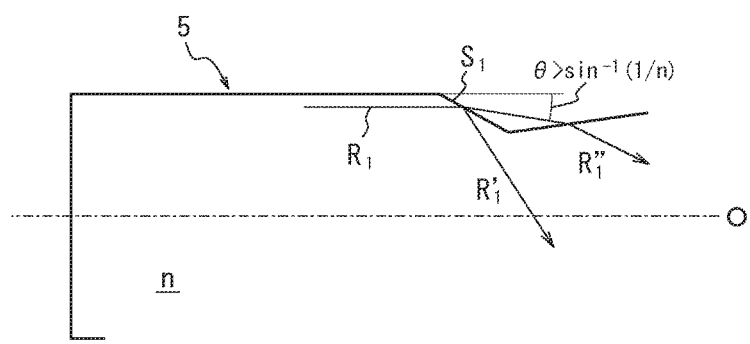
FIG. 9 illustrates the optical path, due to reflection by the first-type inclined surface and transmission, of the side reflected irregular light in the optical axis direction.

Next, the preferred upper limit on the inclination angle θ of the first-type inclined surface $S_1$ is described. FIG. 9 illustrates the optical path, due to reflection by the first-type inclined surface $S_1$ and transmission, of the side reflected irregular light $R_1$ in the optical axis O direction. If the side reflected irregular light $R_1$ strikes the first-type inclined surface $S_1$ of the light guide prism 5 at a greater angle than the total reflection angle, the side reflected irregular light $R_1$ might not only be reflected as $R_1'$ in FIG. 9, but a portion thereof $R_1''$ might pass through the first-type inclined surface $S_1$ and then penetrate into the light guide prism 5 again to produce a ghost. The total reflection angle is given by the following expression, using the refractive index n of the light guide prism 5.

$$\text{total reflection angle} = \sin^{-1}(1/n) \tag{16}$$

Accordingly, the first-type inclined surface $S_1$ preferably satisfies the following expression.

$$|\theta| < \arcsin(1/n) \tag{17}$$

The depth of the groove formed by the first-type inclined surface $S_1$ is proportional to tan θ. If θ in tan θ is 15°, the groove is shallow, easy to clean, and not prone to cracking. Upon exceeding 30°, however, the groove rapidly becomes steep and hence difficult to clean. Accordingly, the inclination angle of the first-type inclined surface $S_1$ is preferably 15° or less.

Figure 10:
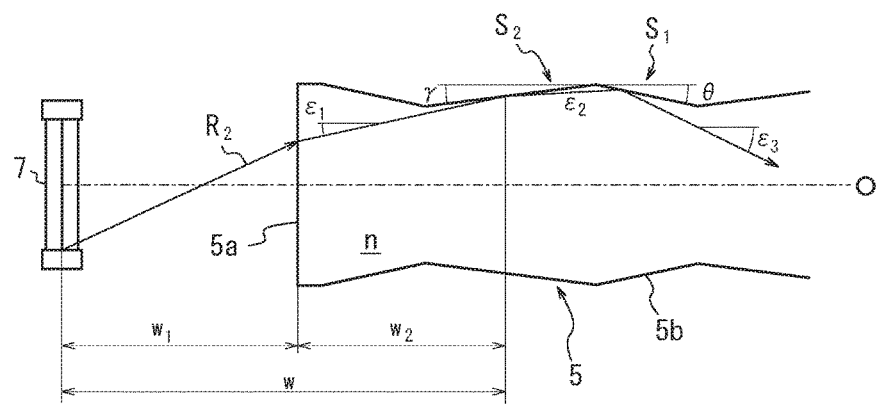
FIG. 10 illustrates the optical path of side reflected irregular light that is incident on the second-type inclined surface of the side of the light guide prism at the maximum inclination angle with respect to the optical axis.

Next, FIG. 10 illustrates the optical path of side reflected irregular light $R_2$ that is incident on the side 5b of the light guide prism 5 at the maximum inclination angle with respect to the optical axis O. As described above, the side reflected irregular light $R_2$ is consecutively reflected at the inclined surface (second-type inclined surface) $S_2$ that recedes from the optical axis O of the regular image light beam in the direction of travel of the regular image light beam and at the inclined surface (first-type inclined surface) $S_1$ that approaches the optical axis O, and the side reflected irregular light $R_2$ is then reflected at the reflecting surface 5c to be directed to the outside of the pupil of the eyeball 6. Let $\varepsilon_1$ be the inclination of the side reflected irregular light $R_2$ relative to the optical axis O within the light guide prism 5, $\varepsilon_2$ be the inclination after reflection by the second-type inclined surface $S_2$, and $\varepsilon_3$ be the inclination after reflection by the first-type inclined surface $S_1$. Also let the inclination angle of the first-type inclined surface $S_1$ relative to the optical axis O be θ and the inclination angle of the second-type inclined surface $S_2$ relative to the optical axis O be γ. Furthermore, $w_1$ indicates the distance from the display surface of the display element 7 to the entrance surface 5a of the light guide prism 5, and $w_2$ indicates the distance in the optical axis O direction from the entrance surface 5a of the light guide prism 5 to the position of incidence of the side reflected irregular light $R_2$ on the second-type inclined surface $S_2$.

First, the following relational expression preferably holds between γ and θ.

$$|\gamma| < 60° - |\theta| \tag{18}$$

By satisfying this relationship, the angle between the first-type inclined surface $S_1$ and the second-type inclined surface $S_2$ becomes 120° or greater, and the valley formed between the two inclined surfaces is easy to clean and is not prone to cracks.

From the law of reflection, the following relationship holds between $\varepsilon_1$, $\varepsilon_3$, γ, and θ.

$$\varepsilon_3 = \varepsilon_1 - 2\gamma + 2\theta \tag{19}$$

The conditions related to side reflected irregular light $R_1$ for avoiding a ghost can be rearranged and applied to $\varepsilon_3$ of the side reflected irregular light $R_2$ as follows.

From Expression (10) and Expression (11), the following holds.

$$|\eta| = 2\alpha$$

Since $|\eta|$ is the minimum angle for avoiding a ghost, the following holds.

$$|\varepsilon_3| > |\eta|$$

Therefore, the following relational expression is derived.

$$|\varepsilon_3| > 2\alpha \tag{20}$$

In the case of FIG. 10, since γ>0, θ<0, $\varepsilon_1$>0, and $\varepsilon_3$<0, the following expressions are derived from Expression (19) and Expression (20).

$$|\varepsilon_3| > |\eta|, -\varepsilon_3 > |\eta|$$

$$\gamma > \frac{1}{2}\varepsilon_1 + \alpha + \theta \tag{21}$$

Rearranging Expression (21) so as to hold even when FIG. 10 is turned upside down (i.e. when γ<0, θ>0, and $\varepsilon_1$<0) yields the following expression.

$$|\gamma| > \frac{1}{2}|\varepsilon_1| - |\theta| + \alpha \tag{22}$$

Figure 11A:
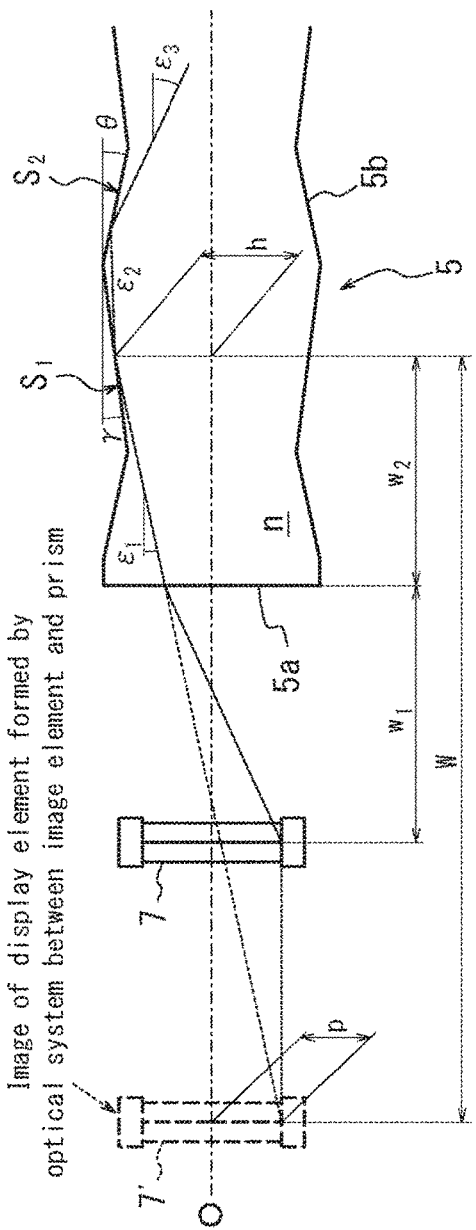
FIG. 11A and FIG. 11B illustrate a condition on the inclination angle ($\gamma$) of the second-type inclined surface.
Figure 11B:
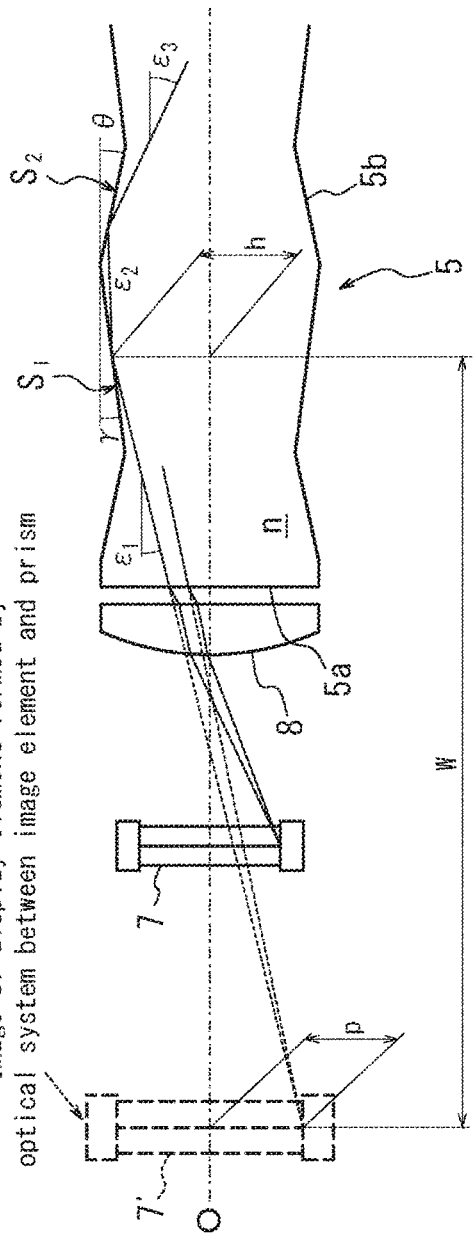

Furthermore, FIG. 11A and FIG. 11B illustrate a condition on the inclination angle γ of the second-type inclined surface $S_2$. In FIG. 11A, there is an open space between the display element 7 and the entrance surface 5a of the light guide prism 5, whereas in FIG. 11B, a convex lens 8 is disposed between the display element 7 and the entrance surface 5a of the light guide prism 5. In FIG. 11A and FIG. 11B, p is the length from the center to the periphery of an image 7' of the display element formed by an optical system between a specific point on the inclined surface $S_2$ and the display element 7, h is the length of a perpendicular to the optical axis O from the specific point on the inclined surface $S_2$, and W is the distance from the intersection between the perpendicular and the optical axis O to the image 7' of the display element. In this case, $\varepsilon_1$ can be expressed as follows.

$$\varepsilon_1 = \tan^{-1}\left(\frac{p+h}{W}\right) \quad (23)$$

By substituting Expression (23) into Expression (22), the inclination angle ($\gamma$) of the second-type inclined surface $S_2$ preferably satisfies the following condition.

$$|\gamma| > \frac{1}{2}\tan^{-1}\left(\frac{p+h}{W}\right) - |\theta| + \alpha \quad (24)$$

EXAMPLES

Returning to FIG. 3, the values of parameters are set as follows as an example of this disclosure.
Focal distance of exit surface 5d formed as convex surface: 26.3 mm
Refractive index of light guide prism 5: n=1.53
Glass path of light guide prism: 28 mm
Radius of light beam at exit surface 5d of light guide prism 5: a=2 mm
Maximum radius of user's pupil 6a: b=4 mm
Distance from exit surface 5d to user's pupil 6a: L=20 mm
Length from center to periphery of image 7' of display element: p=2 mm
(Since there is no optical element with a refractive power between the light guide prism and the display element, p matches the distance from the center to the periphery of the effective region of the display element 7 that emits a regular image light beam.)
Length of perpendicular to optical axis from specific point on second-type inclined surface $S_z$: h=3 mm
Space converted length from intersection between the perpendicular and the optical axis to the display element 7: w=13 mm Based on these parameters, the light rays and the inclination angles $\theta$ and $\gamma$ of the first-type inclined surface $S_1$ and second-type inclined surface $S_2$ are illustrated in FIG. 3.

First, the numerical aperture N of the regular image light beam can be calculated as follows.

$$N = \frac{1}{2 \times F \text{ value of lens}} = \frac{1}{2 \times \left(\frac{\text{focal distance}}{2a}\right)} = 0.076$$

The following value is also derived from this calculation.

$$\sin^{-1}\left(\frac{1}{n}N\right) = \sin^{-1}(0.076/1.53) = 2.8°$$

As calculated based on these values, $\alpha$ in Expression (10) is approximately 4°. Accordingly, the first-type inclined surface $S_1$ has an inclination of approximately 4° or greater. Assuming an inclination of 4°, the side reflected irregular light has an inclination of 8° or greater relative to the optical axis. In FIG. 3, the optical path illustrated without bending at the reflecting surface 5c indicates that the light passing closest to the pupil 6a does not enter the pupil 6a if the light has an inclination of 8° in the light guide prism 5. In other words, light rays within the light guide prism 5 that have an inclination of greater than 8° relative to the optical axis all escape from the pupil 6a, without entering the pupil 6a.

In this example, the inclination angle $\theta$ of the first-type inclined surface $S_1$ is −8°. Therefore, the requirement of Expression (12) is satisfied. By Expression (16), the total reflection angle is approximately 40.1°. Hence, the value of $\theta$ also satisfies Expression (17). The absolute value of $\theta$ is the preferred value of 15° or less. Accordingly, as illustrated in FIG. 3, the side reflected irregular light $R_1$ entering the first-type inclined surface $S_1$ is completely reflected at the first-type inclined surface $S_1$ and then reflected at the reflecting surface 5c to be emitted from the exit surface 5d to the outside of the user's pupil 6a. Therefore, the side reflected irregular light $R_1$ is not visible to the user's eye.

From Expression (23), $\varepsilon_1$ is approximately 14°. Applying this to Expression (22) yields the condition that the inclination angle $\gamma$ of the second-type inclined surface $S_2$ be 3° or greater. In this example, $\gamma$ is 7°, thus satisfying the condition of Expression (22). Since $\theta$ is −8°, the relationship of Expression (18) is also satisfied. As a result, in FIG. 3, the side reflected irregular light $R_2$ that is emitted from one edge of the display element 7, crosses the optical axis, and is incident on the second-type inclined surface $S_2$ is, as illustrated in FIG. 3, sequentially reflected by the second-type inclined surface $S_2$, first-type inclined surface $S_1$, and reflecting surface 5c to be emitted from the exit surface 5d to the outside of the user's pupil 6a. Therefore, the side reflected irregular light $R_2$ is not visible to the user's eye. Among the light that is emitted from the display element 7 and is incident on the second-type inclined surface $S_2$, the side reflected irregular light $R_2$ is incident at the largest inclination angle relative to the optical axis. When the side reflected irregular light $R_2$ is incident on the second-type inclined surface $S_2$ at a smaller angle, the inclination angle after reflection at the first-type inclined surface $S_1$ becomes larger, causing the light that is emitted from the light guide prism 5 to be deflected further away from the direction of the eyeball 6.

As described above, according to this embodiment, the light guide prism 5 includes the first-type inclined surface $S_1$ on the side 5b. The first-type inclined surface $S_1$ is formed to be inclined at an inclination angle that causes the side reflected irregular light $R_1$ incident from a direction along the optical axis of the regular image light beam to be reflected and emitted to the outside of the user's eyeball 6. Hence, the side reflected irregular light $R_1$ is not visible to the user and does not produce a ghost. The light guide prism 5 also includes the second-type inclined surface $S_2$ adjacent to the display element 7 side of the first-type inclined surface $S_1$. The second-type inclined surface $S_2$ is formed to be inclined at an inclination angle that causes the side reflected irregular light $R_2$, from the display element 7, inclined at the largest inclination angle relative to the optical axis of the regular image light beam and incident on the second-type inclined surface $S_2$ to be reflected by the second-type inclined surface $S_2$ and then reflected by the first-type inclined surface $S_1$ and emitted to the outside of the user's eyeball 6. Hence, the side reflected irregular light $R_2$ is not visible to the user and does not produce a ghost.

Unlike when forming a V-groove to block the side reflected irregular light, in this embodiment the side reflected irregular light is reflected by the first-type inclined surface $S_1$ and the second-type inclined surface $S_2$ formed as polished surfaces and is directed to the outside of the pupil of the user's eyeball 6. Therefore, the inclination angle of the inclined surfaces $S_1$ and $S_2$ relative to the optical axis necessarily decreases, so that any sebum or the like adhering to the valley between the first-type inclined surface $S_1$ and the second-type inclined surface $S_2$ can easily be cleaned off. As a result, the occurrence of cracks caused by sebum or the like adhering to the groove can also be prevented.

Furthermore, the light guide prism 5 achieves the following effects regardless of whether the first-type inclined surface $S_1$ and the second-type inclined surface $S_2$ are positioned inside the housing of the body 3 or are exposed outside of the housing. First, unlike when providing a V-groove, there is no need to fill the groove with a light-blocking member, allowing the light guide prism to be formed easily. Furthermore, when the optical path of the light guide prism is long, a V-groove used to prevent ghosts needs to be made deep. To make the V-groove deep, the light guide prism needs to be formed thick so that the regular image light beam is not obstructed by the V-groove. The device thus increases in size. By contrast, in the light guide prism 5 of this embodiment, the inclination of the first inclined surface $S_1$ and the second inclined surface $S_2$ is gradual. Therefore, by shortening the width of the inclined surfaces $S_1$ and $S_2$ in the optical axis direction, the effect of preventing ghosts can be obtained even without making the light guide prism 5 much thicker than the optical path of the regular image light beam. Furthermore, when an external force is applied to a light guide prism provided with a V-shaped groove having an acute-angled tip, stress concentrates at the apex of the V-shape, and damage such as cracking might occur. The light guide prism 5 of this embodiment, however, does not have such a groove with a small apex angle at the tip and is therefore more robust with respect to external forces.

Embodiment 2

Figure 12:
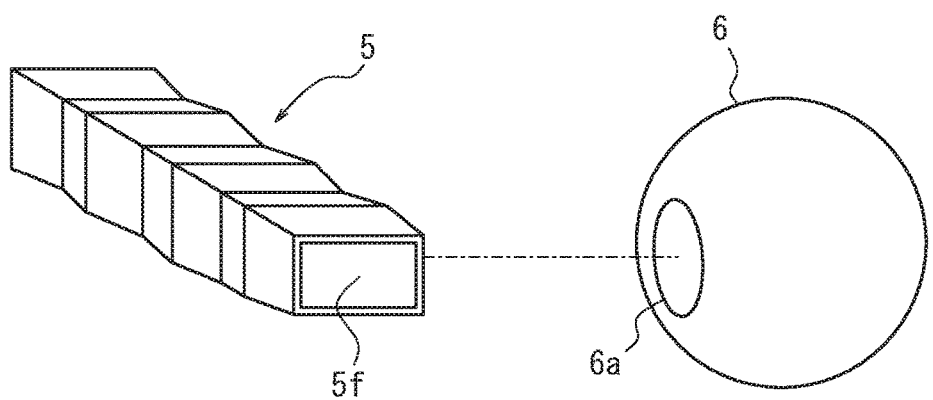
FIG. 12 illustrates the light guide prism according to Embodiment 2 and an eyeball.

FIG. 12 illustrates a light guide prism 5 according to Embodiment 2 and an eyeball 6. The light guide prism 5 of Embodiment 2 has a different structure at the tip than in the light guide prism 5 of Embodiment 1. The tip of the light guide prism 5 is a concave mirror 5*f* that has a reflecting surface facing the inside of the light guide prism 5. As in Embodiment 1, first-type inclined surfaces $S_1$ and second-type inclined surfaces $S_2$ are formed along the sides 5*b* of the light guide prism 5 so as to surround the optical axis and are repeatedly disposed adjacent to one another.

Figure 13:
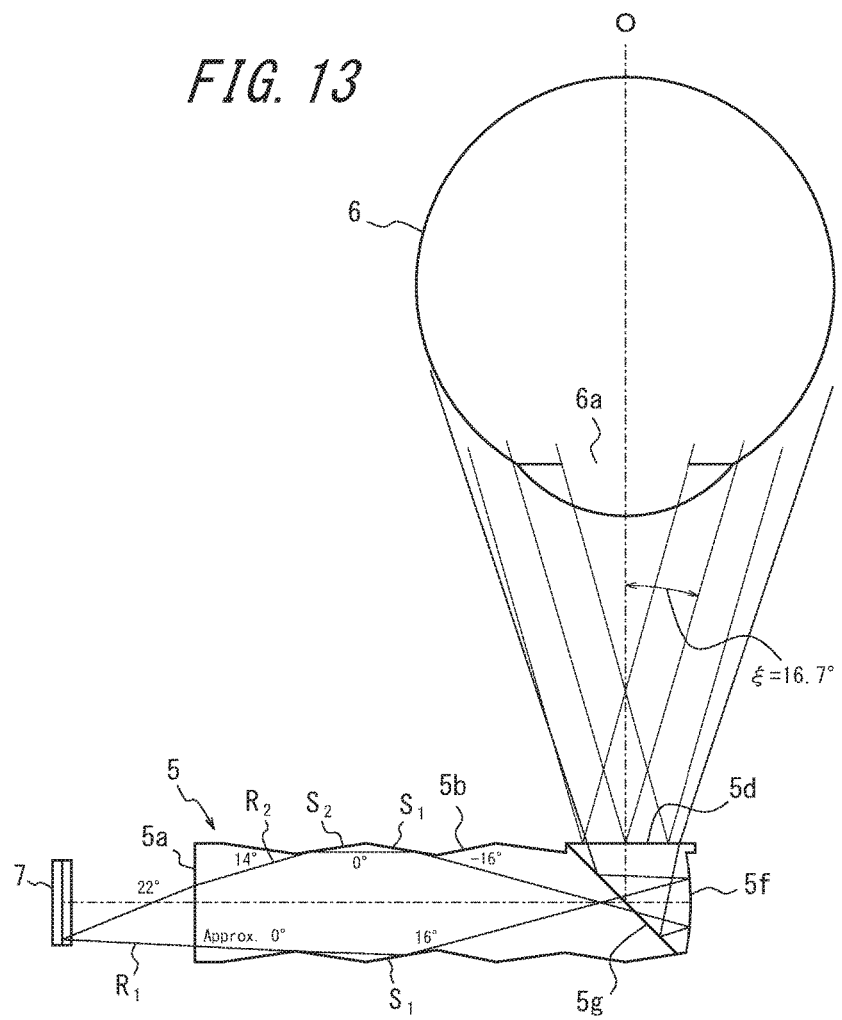
FIG. 13 illustrates the optical path of side reflected irregular light emitted from the display element.

FIG. 13 illustrates the optical path of side reflected irregular light $R_1$ and $R_2$ emitted from the display element 7. A semi-transparent mirror 5*g* is provided in the light guide prism 5 at an inclination of approximately 45° relative to the concave mirror 5*f*. The exit surface 5*d* does not have a refractive power. The regular image light beam enters from the entrance surface 5*a*, passes through the semi-transparent mirror 5*g*, is reflected by the concave mirror 5*f* and by the semi-transparent mirror 5*g*, and is emitted from the exit surface 5*d* to enter the pupil 6*a*. The remaining structure is similar to Embodiment 1, identical constituent elements are labeled with the same reference signs, and a description thereof is omitted.

With the positive refractive power of the concave mirror 5*f*, the light guide prism 5 of this embodiment allows a virtual image of an image displayed on the display element 7 to be observed. As illustrated in FIG. 13, the side reflected irregular light $R_1$ and $R_2$ that is incident on the first-type inclined surface $S_1$ and the second-type inclined surface $S_2$ is emitted in a direction other than the pupil 6*a* of the user's eyeball 6, as in Embodiment 1, and therefore is not visible to the user and does not form a ghost. Furthermore, as in Embodiment 1, the inclination angle of the first-type inclined surface $S_1$ and the second-type inclined surface $S_2$ is small. Hence, the groove can be cleaned easily, and cracks can be prevented, as in Embodiment 1.

Embodiment 3

Figure 14:
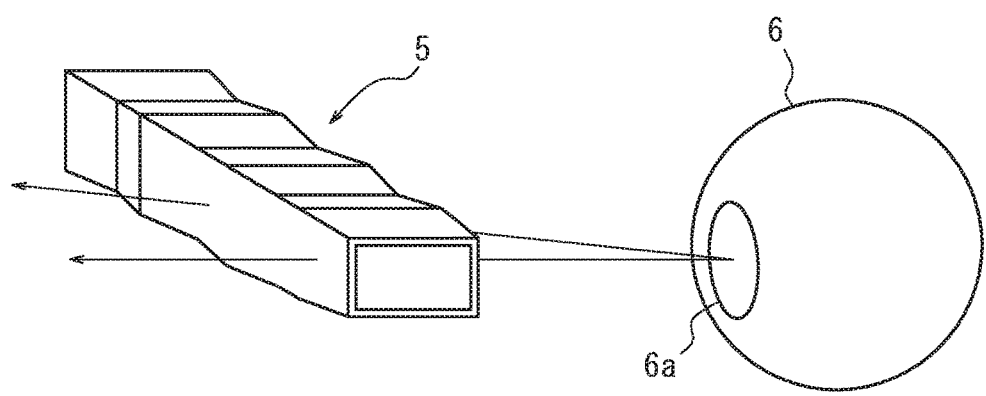
FIG. 14 illustrates the light guide prism according to Embodiment 3 and an eyeball.

FIG. 14 illustrates a light guide prism according to Embodiment 3 and an eyeball 6. This light guide prism 5 is like the light guide prism 5 according to Embodiment 2, but with the front and back sides 5*b* being formed flat, without inclined surfaces. The width of the light guide prism 5 in the front-back direction (towards the back as seen from the eye) is greater than in the light guide prism 5 of Embodiment 2. By increasing the width in the front-back direction, unnecessary reflection at the sides on the front and the back of the light guide prism 5 is reduced without providing inclined surfaces, thereby preventing ghosts. Furthermore, even if the width in the front-back direction is increased, the width (height) of the side at the back facing the user's eyeball 6 does not change. Therefore, the extent to which the light guide prism 5 blocks the user's field of view does not change. The remaining structure is the same as in Embodiment 2. Note that the arrows in FIG. 14 indicate examples of viewing directions.

By using the light guide prism 5 according to this embodiment, the user can observe the background behind the light guide prism 5 through the flat, non-inclined sides at the front and back of the transparent light guide prism 5. In other words, this embodiment improves the see-around function. Furthermore, using the semi-transparent mirror (5*g* in FIG. 13) allows the creation of a see-through image that simultaneously displays the image of the display element 7 and the background image of the light guide prism 5 in the field of view.

Embodiment 4

FIG. 15 illustrates the structure of the optical system of a head-mounted display device according to Embodiment 4. The head-mounted display device includes a display element 7, a light guide prism 5, and a housing 10 that contains the display element 7 and that surrounds and supports the outer perimeter of one end of the light guide prism 5 including an entrance surface 5*a*. As in Embodiments 2 and 3, the light guide prism 5 includes a concave mirror 5*f* and a semi-transparent mirror 5*g* at the exit surface 5*d* side. At the portion of the light guide prism 5 that is covered by the housing 10, flat surfaces 5*h* and 5*i* with nearly no inclination in the optical axis direction are provided adjacent in the optical axis direction on either side of V-grooves 9 for blocking light. The inner walls of the housing 10 secure and hold the flat surfaces 5*h* and 5*i* of the light guide prism 5. On the other hand, at the portion of the light guide prism 5 that is exposed from the housing 10, a first-type inclined surface $S_1$ and an adjacent second-type inclined surface $S_2$ are provided alternately, as in Embodiments 1 and 2. The remaining structure is similar to that of Embodiment 1.

According to this embodiment, in addition to removing ghosts by reflection at the first-type inclined surface $S_1$ and the second-type inclined surface $S_2$, as described in Embodiment 1, ghosts can be more effectively removed by blocking the side reflected irregular light with the V-grooves 9. Since the V-grooves 9 are covered by the housing 10, they are not touched directly by the user, and therefore no sebum or the like adheres thereto.

Embodiment 5

Figure 16A:
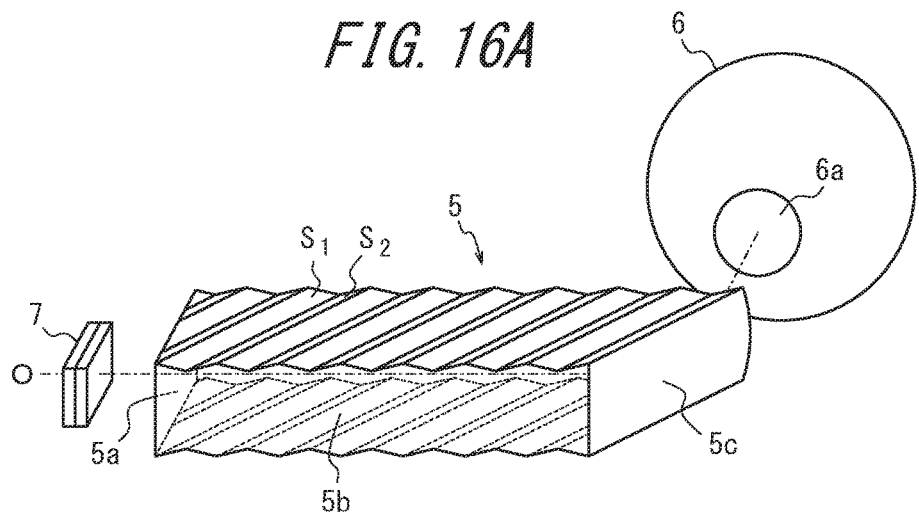
FIG. 16A is a perspective view illustrating a light guide prism according to Embodiment 5 along with a display element and an eyeball.
Figure 16B:
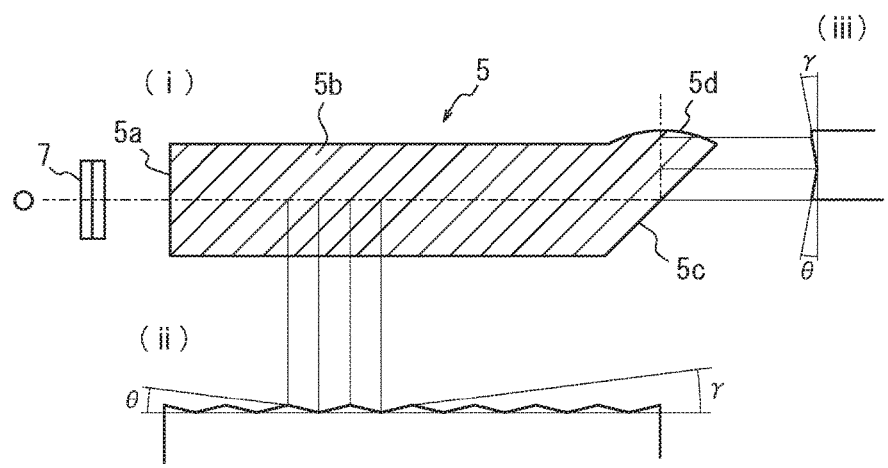
FIG. 16B illustrates the shape of the light guide prism, where (i) is a top view, (ii) is a partial cross-sectional diagram in the perpendicular direction along the optical axis, and (iii) is a partial cross-sectional diagram of the tip.

FIG. 16A is a perspective view illustrating a light guide prism according to Embodiment 5 used in a head-mounted display device along with a display element 7 and an eyeball 6. FIG. 16B illustrates the shape of the light guide prism 5, where (i) is a top view, (ii) is a partial cross-sectional diagram in the perpendicular direction along the optical axis, and (iii) is a partial cross-sectional diagram of the tip. On the sides 5b at the top and the bottom of the light guide prism 5, first-type inclined surfaces $S_1$ and adjacent second-type inclined surfaces $S_2$ are provided alternately so that ridges are formed in a direction that is not orthogonal to but rather inclined from the optical axis O direction of the light guide prism 5. The remaining structure is similar to that of Embodiment 1.

According to this embodiment, as illustrated in (ii) and (iii) of FIG. 16B, when the inclination components in a cross-section of the inclined surfaces along the optical axis of the first-type inclined surface $S_1$ and the second-type inclined surface $S_2$ are $\theta$ and $\gamma$, the same effects as in Embodiment 1 can be obtained by determining the measurements and the shape (including the inclination angle of the inclined surfaces) of the light guide prism 5 based on relational Expressions (10) to (12), (17), (18), (22), (24), and the like in the description of Embodiment 1.

Embodiment 6

Figure 17:
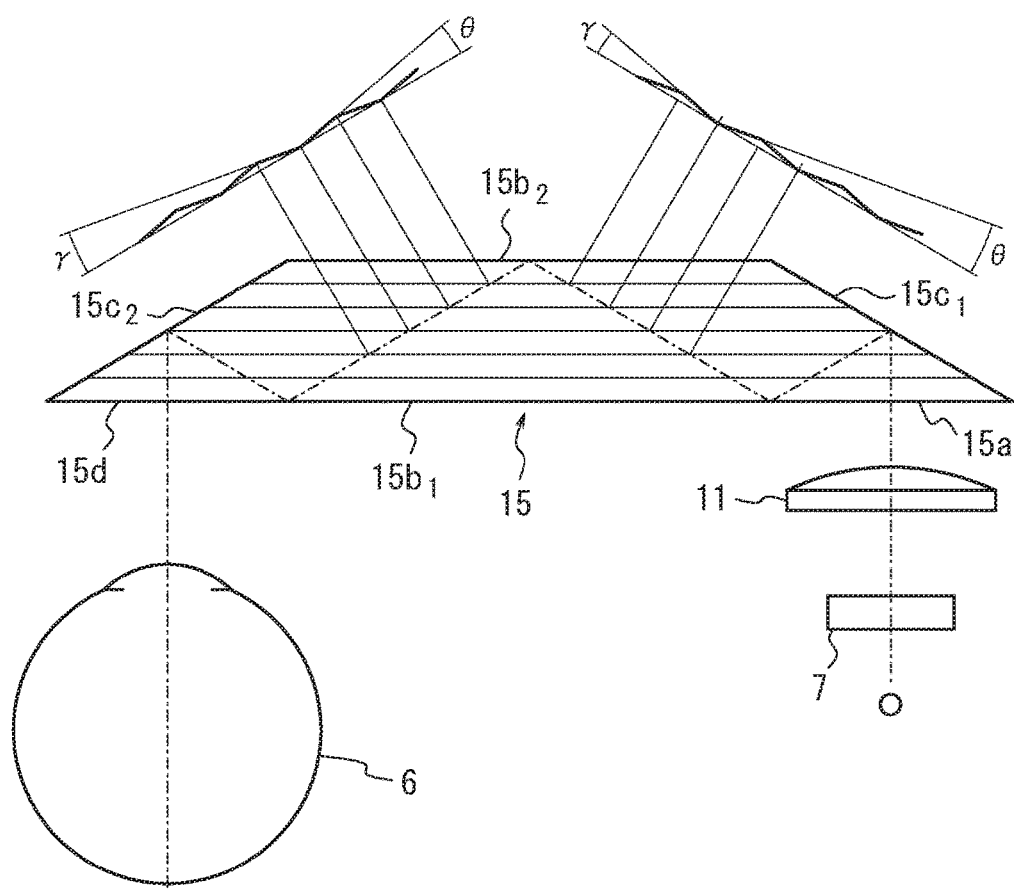
FIG. 17 illustrates the structure of a head-mounted display device according to Embodiment 6 along with a partial cross-sectional diagram along the optical axis direction.

FIG. 17 illustrates the structure of a head-mounted display device according to Embodiment 6 along with a partial cross-sectional diagram along the optical axis direction. A cross-section in the horizontal direction of a light guide prism 15 in a state of use has a trapezoidal shape with a short base at the front (in the direction of the user's line of sight) and a long base at the back (in the direction of the user's eyeball). The light guide prism 15 overall has a shape that is longer in the direction of the bases (longitudinal direction). The width in the vertical direction is roughly constant.

A flat entrance surface 15a is formed at one end of a side 15$b_1$ at the back of the light guide prism 15, and a flat exit surface 15d is formed at the other end. A reflecting surface 15$c_1$ at the entrance side and a reflecting surface 15$c_2$ at the exit side, formed as polished surfaces, are respectively provided on the surfaces corresponding to the legs of the trapezoid in the cross-sectional diagram of the light guide prism 15 in FIG. 17. Furthermore, a display element 7 is disposed opposite the entrance surface 15a of the light guide prism 15, and a convex lens 11 is disposed between the entrance surface 15a and the display element 7. The end at the entrance surface 15a side of the light guide prism 15, the display element 7, and the convex lens 11 are supported by a non-illustrated body housing.

On the upper side and lower side of the light guide prism 15, adjacent inclined surfaces that extend in a direction roughly parallel to the front and back bases and for which the normal direction is inclined to the front and the back are provided alternately. As a result, a plurality of depressions are formed extending in the longitudinal direction of the light guide prism 15. In other words, on the upper side and lower side of the light guide prism 15, a plurality of flat surfaces that form convex ridges and concave ridges extending in the longitudinal direction are alternately formed. Depressions are not formed on the sides at the front and the back that constitute the path that reflects the regular image light beam. Since the remaining structure is similar to that of Embodiment 1, a description is omitted.

According to the above-described structure, the regular image light beam exiting from the display element 7 passes through the convex lens 11, enters the light guide prism 15 through the entrance surface 15a, is internally reflected by the reflecting surface 15$c_1$, the side 15$b_1$ at the back, the side 15$b_2$ at the front, the side 15$b_1$ at the back, and the reflecting surface 15$c_2$ in this order, and is emitted from the exit surface 15d towards the user's eyeball 6. With the positive refractive power of the convex lens 11, the user can observe the image displayed on the display element 7 as a magnified virtual image.

Conversely, the side reflected irregular light that does not contribute to image observation is reflected by the inclined surfaces formed on the upper and lower sides of the light guide prism 15 and is emitted to the outside of the user's pupil. The light guide prism 15 of this embodiment compares to the first-type inclined surface $S_1$ and the second-type inclined surface $S_2$ of Embodiment 1 as follows. Since the optical axis has a zigzag shape within the light guide prism 15 of this embodiment, for example a surface that approaches the optical axis O in the direction of travel of the light beam with respect to the optical axis O from the side 15$b_1$ at the back towards the side 15$b_2$ at the front recedes from the optical axis O in the direction of travel of the light beam with respect to the optical axis O from the side 15$b_2$ at the front towards the side 15$b_1$ at the back. In other words, in the light guide prism 15, one inclined surface functions as both the first-type inclined surface and the second-type inclined surface with respect to the regular image light beam. Accordingly, the angle of each inclined surface formed on the upper and lower sides of the light guide prism 15 is set to simultaneously satisfy the conditions on both $|\theta|$ and $|\gamma|$ in Embodiment 1.

According to this embodiment, even when using the light guide prism 15 that repeatedly reflects the regular image light beam internally, side reflected irregular light can be emitted to the outside of the user's eyeball 6 by forming depressions constituted by a plurality of inclined surfaces on the sides. The grooves of the depressions are shallow and are therefore easy to clean, as in Embodiments 1 to 5.

In each of the above-described embodiments, the first-type inclined surface $S_1$ and the second-type inclined surface $S_2$ of the light guide prism are formed as polished surfaces, but the first-type inclined surface $S_1$ and the second-type inclined surface $S_2$ may also be formed as rough surfaces, such as sand surfaces. Even when a portion of incident irregular light is diffusely reflected by such rough surfaces, the reflected light is stronger in the positive reflection direction of the incident irregular light. This light that is strong in the positive reflection direction is emitted to the outside of the pupil of the user's eye as in each of the above-described embodiments. Hence, even when forming the first-type inclined surface $S_1$ and the second-type inclined surface $S_2$ as rough surfaces that are grainy or the like, a sufficient effect of removing ghosts due to side reflected irregular light can be obtained.

Embodiment 7

Figure 18A:
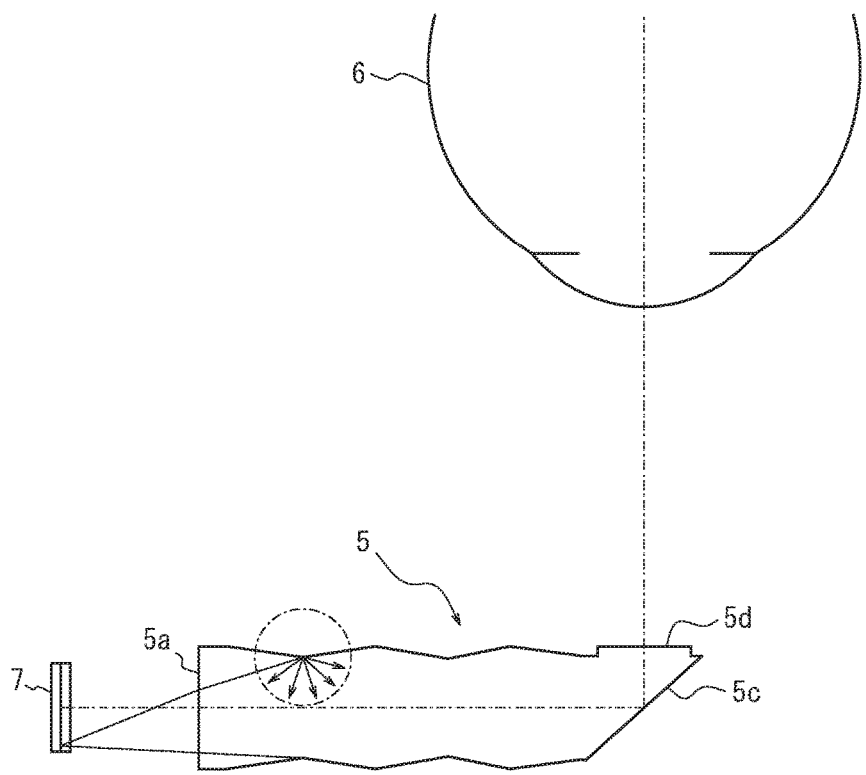
FIG. 18A illustrates the optical path of the side reflected irregular light emitted from the display element of a head-mounted display device according to Embodiment 7.
Figure 18B:
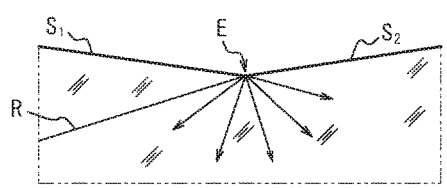
FIG. 18B is an enlarged view of reflection of irregular light due to a ridge of the light guide prism in FIG. 18A.

FIG. 18A illustrates the optical path of the side reflected irregular light emitted from the display element 7 in a head-mounted display device according to Embodiment 7. FIG. 18B is an enlarged view of the region surrounded by the dot-dash line in FIG. 18A, illustrating reflection of irregular light due to a ridge of the light guide prism in FIG. 18A. The light guide prism 5 in this embodiment differs from the light guide prism of Embodiment 1 (FIG. 3) in that at least a portion of the sides constituted by the first-type inclined surface $S_1$ and the second-type inclined surface $S_2$ is formed as a rough surface (for example, grainy or pearskin). In FIGS. 18A and 18B, a ridge E formed by the first-type inclined surface $S_1$ and the second-type inclined surface $S_2$ is a rough surface.

Figure 19A:
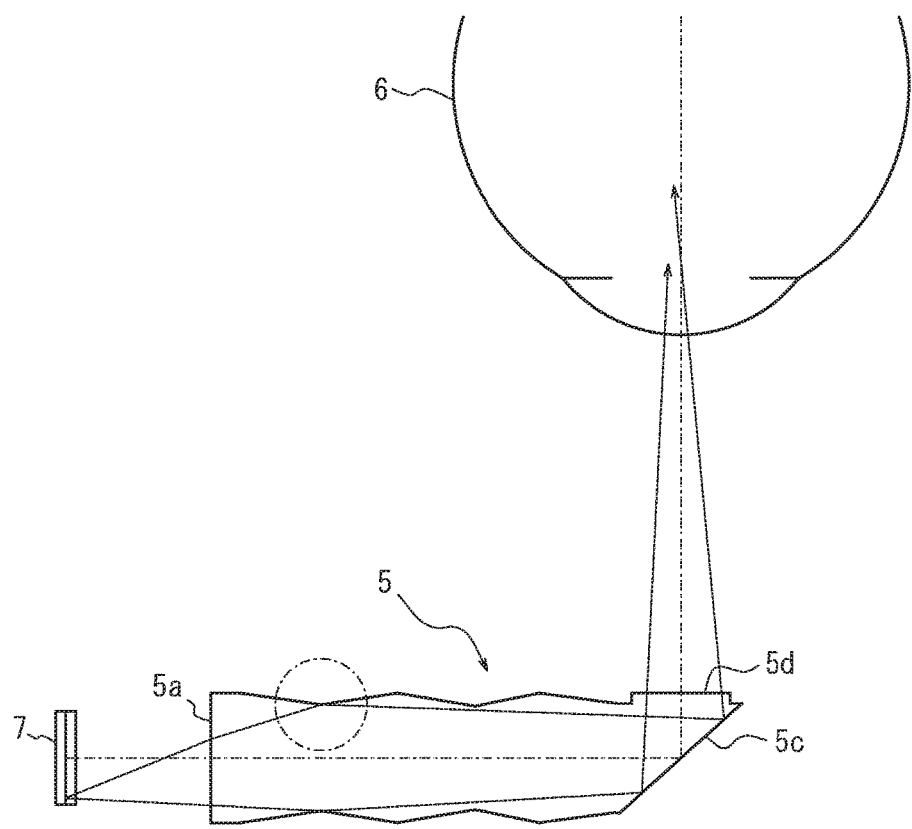
FIG. 19A illustrates the optical path within the light guide prism in a comparative example with respect to FIG. 18A.
Figure 19B:
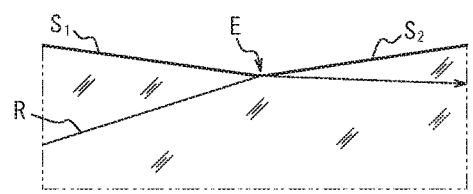
FIG. 19B is an enlarged view of reflection of irregular light due to a ridge of the light guide prism in FIG. 19A.

For the sake of comparison, FIG. 19A illustrates the optical path within the light guide prism of a Comparative Example with respect to FIG. 18A. FIG. 19B is an enlarged view of reflection of irregular light at the ridge E of the light guide prism in the region surrounded by the dot-dash line in FIG. 19A. In particular when the light guide prism 5 is manufactured by resin molding, the ridge formed by the first-type inclined surface $S_1$ and the second-type inclined surface $S_2$ tends to be rounded, depending on the manufacturing accuracy. Therefore, as illustrated in FIGS. 19A and 19B, the irregular light reflected at the ridge E becomes a light ray with a smaller inclination than the inclination which might produce a slight ghost. By contrast, in this embodiment, a rough surface is formed near the ridge E, thereby scattering reflected light at the ridge E and directing irregular light to the outside of the pupil of the eyeball 6, as illustrated in FIGS. 18A and 18B. In other words, ghosts can be removed regardless of the manufacturing accuracy of the light guide prism 5.

Either or both of the first-type inclined surface $S_1$ and the second-type inclined surface $S_2$ may be formed as a rough surface. As a result, the first-type inclined surface $S_1$ and/or the second-type inclined surface $S_2$ formed as a rough surface scatters irregular light and also causes a regular reflection component of relatively strong irregular light to travel along a similar optical path as described in Embodiment 1 and be emitted to the outside of the user's pupil. A double measure against ghosts is thus implemented. Accordingly, a measure can be taken against ghosts regardless of the manufacturing accuracy of the light guide prism 5. Furthermore, the mold is easier to produce than in the case of only the area near the ridge E being a rough surface, thereby also reducing manufacturing costs.

This disclosure is not limited to the above embodiments, and a variety of changes and modifications may be made. For example, the support of the head-mounted display device is not limited to being an eyeglass-type support and may be any of a variety of shapes, such as goggles or a helmet, that can secure the head-mounted display device to the user's head. The light guide prism is not limited to being long in the horizontal direction when used. For example, the display element may be disposed by the frontal region, and a light guide prism that is long in the perpendicular direction may be used. A variety of materials may be used for the light guide prism, but resin is preferred. The light guide prism is easier to manufacture when using resin such as plastic.

The invention claimed is:

1. A head-mounted display device comprising:
   a display element;
   a light guide prism configured, in a state of use, to guide a regular image light beam emitted from the display element, to make the regular image light beam emit from an exit surface of the light guide prism and to make the regular image light beam to enter into a pupil of a user; and
   a support configured to secure the display element and the light guide prism with respect to a head of the user;
   wherein on at least one side along an optical axis of the regular image light beam, the light guide prism includes at least one first-type inclined surface, and the first-type inclined surface is formed to be inclined at an inclination angle that causes light other than the regular image light beam emitted from the display element and incident on the first-type inclined surface from a direction along the optical axis of the regular image light beam to be reflected and emitted from the exit surface to outside of the pupil of the user.

2. The head-mounted display device of claim 1, wherein the first-type inclined surface is formed as a polished surface and totally reflects the light incident from the direction along the optical axis of the regular image light beam.

3. The head-mounted display device of claim 1, wherein the first-type inclined surface is formed to be inclined at an angle that causes a regular reflection component of the light incident from the direction along the optical axis of the regular image light beam to be emitted to outside of an eyeball of the user.

4. The head-mounted display device of claim 1, wherein the first-type inclined surface is formed so that a relationship $|\theta|<\arcsin(1/n)$ is satisfied, where n is a refractive index of the light guide prism, and $\theta$ is the inclination angle of the first-type inclined surface relative to the optical axis of the regular image light beam adjacent to the first-type inclined surface.

5. The head-mounted display device of claim 1, wherein the first-type inclined surface is formed so that following formulas (1) and (2) are satisfied;

$$|\xi| = \tan^{-1}\left(\frac{a+b}{L}\right) \quad (1)$$

and $$\frac{1}{2}\left|\sin^{-1}\left(\frac{1}{n}\sin|\xi|\right) - \sin^{-1}\left(\frac{1}{n}N\right)\right| < |\theta| \quad (2)$$

where n is a refractive index of the light guide prism, N is a numerical aperture of the regular image light beam that enters the light guide prism, a is a radius of the regular image light beam at an exit surface of the light guide prism, b is a maximum radius of the pupil of the user in terms of design, L is a distance from the exit surface to the pupil of the user in terms of design, and $\theta$ is the inclination angle of the first-type inclined surface relative to the optical axis of the regular image light beam adjacent to the first-type inclined surface.

6. The head-mounted display device of claim 5, wherein the maximum radius b of the pupil of the user in terms of design is 3.5 mm to 4.5 mm, and the distance L from the exit surface to the pupil of the user in terms of design is 10 mm to 20 mm.

7. The head-mounted display device of claim 1, wherein the light guide prism includes a second-type inclined surface, adjacent to the display element side of the first-type inclined surface, and the second-type inclined surface is formed to be inclined at an inclination angle that causes light, from the display element, inclined at a largest inclination angle relative to the optical axis of the regular image light beam and incident on the second-type inclined surface to be reflected by the second-type inclined surface and then reflected by the first-type inclined surface and emitted to the outside of the pupil of the user.

8. The head-mounted display device of claim 7, wherein the second-type inclined surface is formed as a polished surface.

9. The head-mounted display device of claim 7, wherein the second-type inclined surface is formed so that a relationship |γ|<60°−|θ| is satisfied, where θ is the inclination angle of the first-type inclined surface relative to the optical axis of the regular image light beam adjacent to the first-type inclined surface, and γ is the inclination angle of the second-type inclined surface relative to the optical axis of the regular image light beam adjacent to the second-type inclined surface.

10. The head-mounted display device of claim 7, wherein the first-type inclined surface is positioned by the second-type inclined surface in a direction of travel of the regular image light beam, and the second-type inclined surface is formed so that following formulas (3) and (4) are satisfied;

$$|\gamma| > \frac{1}{2}|\varepsilon| - |\theta| + \alpha \qquad (3)$$

and $$\alpha = \frac{1}{2}\left|\sin^{-1}\left(\frac{1}{n}\sin|\xi|\right) - \sin^{-1}\left(\frac{1}{n}N\right)\right| \qquad (4)$$

where θ is the inclination angle of the first-type inclined surface relative to the optical axis of the regular image light beam adjacent to the first-type inclined surface, ε is a maximum inclination angle of a light ray incident on the second-type inclined surface at a specific point, and γ is the inclination angle of the second-type inclined surface relative to the optical axis of the regular image light beam adjacent to the second-type inclined surface.

11. The head-mounted display device of claim 10, wherein a following formula (5) is satisfied;

$$\varepsilon = \tan^{-1}\left(\frac{p+h}{W}\right) \qquad (5)$$

where p is a length from a center to a periphery of an image of the display element formed by an optical system between a position of the specific point on the second-type inclined surface and the display element, h is a length of a perpendicular to the optical axis from the specific point on the second-type inclined surface, and W is a distance from an intersection between the perpendicular and the optical axis to the image of the display element.

12. The head-mounted display device of claim 7, wherein the first-type inclined surface approaches the optical axis of the regular image light beam in a direction of travel of the regular image light beam, and the second-type inclined surface recedes from the optical axis of the regular image light beam in the direction of travel of the regular image light beam.

13. The head-mounted display device of claim 12, wherein the light guide prism has at least two continuous depressions by the first-type inclined surface and the second-type inclined surface being formed alternately.

14. The head-mounted display device of claim 13, wherein surface roughening treatment is applied near a ridge of the depressions formed by the first-type inclined surface and the second-type inclined surface.

15. A light guide prism comprising:
an entrance surface through which light enters;
an exit surface configured to emit light entering from the entrance surface; and
a plurality of sides surrounding an optical path of the light;
wherein on at least a portion of the sides, a plurality of inclined surfaces formed by a first-type inclined surface and a second-type inclined surface with different inclination directions are disposed to form two or more continuous depressions, the first-type inclined surface is inclined, relative to an optical axis of light entering from the entrance surface and emitted from the exit surface, at an inclination angle θ so as to approach the optical axis in a direction of travel of the light, the second-type inclined surface is inclined, relative to the optical axis, at an inclination angle γ so as to recede from the optical axis in the direction of travel of the light, and the first-type inclined surface and the second-type inclined surface that are adjacent to form the depressions satisfy |γ|<60°−|θ|.

16. The light guide prism of claim 15, wherein the first-type inclined surface and the second-type inclined surface are formed as polished surfaces.

17. The light guide prism of claim 15, wherein surface roughening treatment is applied to at least a portion of the first-type inclined surface and the second-type inclined surface.

18. The light guide prism of claim 15, further comprising a reflecting surface configured to reflect the light incident from the entrance surface towards the exit surface.

19. The light guide prism of claim 15, wherein the first-type inclined surface is formed so that |θ|<arcsin(1/n), where n is a refractive index of the light guide prism, and θ is the inclination angle of the first-type inclined surface relative to the optical axis.

20. The light guide prism of claim 15, wherein the entrance surface is positioned so that a regular image light beam from a display element enters through the entrance surface, and the exit surface emits the regular image light beam towards an eyeball; and
the first-type inclined surface is formed so that following formulas (6) and (7) are satisfied;

$$|\xi| = \tan^{-1}\left(\frac{a+b}{L}\right) \qquad (6)$$

and $$\frac{1}{2}\left|\sin^{-1}\left(\frac{1}{n}\sin|\xi|\right) - \sin^{-1}\left(\frac{1}{n}N\right)\right| < |\theta| \qquad (7)$$

where n is a refractive index of the light guide prism, N is a numerical aperture of the regular image light beam that enters the light guide prism, a is a radius of the regular image light beam at an exit surface of the light guide prism, b is a maximum radius of the pupil of the user in terms of design, L is a distance from the exit surface to the pupil of the user in terms of design, and θ is the inclination angle of the first-type inclined surface relative to the optical axis of the regular image light beam adjacent to the first-type inclined surface.

21. The light guide prism of claim 20, wherein the first-type inclined surface is positioned by the second-type inclined surface in the direction of travel of the regular image light beam, and the second-type inclined surface is formed so that following formulas (8) and (9) are satisfied;

$$|\gamma| > \frac{1}{2}|\varepsilon| - |\theta| + \alpha \quad (8)$$

and $$\alpha = \frac{1}{2}\left|\sin^{-1}\left(\frac{1}{n}\sin|\varepsilon|\right) - \sin^{-1}\left(\frac{1}{n}N\right)\right| \quad (9)$$

where $\varepsilon$ is a maximum inclination angle of a light ray incident on the second-type inclined surface at a specific point, and $\gamma$ is the inclination angle of the second-type inclined surface relative to the optical axis of the regular image light beam adjacent to the second-type inclined surface.

\* \* \* \* \*